(12) United States Patent
Spittle

(10) Patent No.: US 8,728,460 B2
(45) Date of Patent: *May 20, 2014

(54) BIOLOGICAL SOIL NUTRIENT SYSTEM

(75) Inventor: Kevin S. Spittle, Vero Beach, FL (US)

(73) Assignee: Profile Products, L.L.C., Buffalo Grove, IL (US)

( * ) Notice: Subject to any disclaimer, the term of this patent is extended or adjusted under 35 U.S.C. 154(b) by 531 days.

This patent is subject to a terminal disclaimer.

(21) Appl. No.: 12/878,270

(22) Filed: Sep. 9, 2010

(65) Prior Publication Data

US 2011/0003693 A1  Jan. 6, 2011

Related U.S. Application Data

(63) Continuation-in-part of application No. 11/619,831, filed on Jan. 4, 2007, now Pat. No. 7,854,926.

(51) Int. Cl.
| | |
|---|---|
| *A01N 3/02* | (2006.01) |
| *A01N 59/00* | (2006.01) |
| *A01N 63/00* | (2006.01) |
| *A01N 63/04* | (2006.01) |
| *A01N 65/00* | (2009.01) |
| *C12N 1/00* | (2006.01) |
| *C12N 11/00* | (2006.01) |
| *C12N 11/14* | (2006.01) |
| *C12N 1/20* | (2006.01) |

(52) U.S. Cl.
USPC ..... 424/93.4; 424/93.3; 424/93.46; 424/93.5; 435/174; 435/176; 435/252.4; 435/252.5; 435/254.1; 504/113; 504/117; 504/119

(58) Field of Classification Search
None
See application file for complete search history.

(56) References Cited

U.S. PATENT DOCUMENTS

| | | | |
|---|---|---|---|
| 4,551,165 A | 11/1985 | Warner | |
| 4,581,846 A * | 4/1986 | Stensaas | 47/48.5 |
| 5,147,441 A | 9/1992 | Megeed | |
| 5,447,866 A | 9/1995 | Runyon | |
| 6,331,300 B1 | 12/2001 | Dybas et al. | |

* cited by examiner

*Primary Examiner* — Debbie K Ware
(74) *Attorney, Agent, or Firm* — Brooks Kushman P.C.

(57) ABSTRACT

A biological soil nutrient system that combines beneficial soil fungi and bacteria in a growth promoting nutrient medium, embedded in an inorganic porous ceramic particle for direct delivery during soil aerification to the rhizosphere of adventitious plants, including sports turf, landscape and agricultural applications.

20 Claims, 1 Drawing Sheet

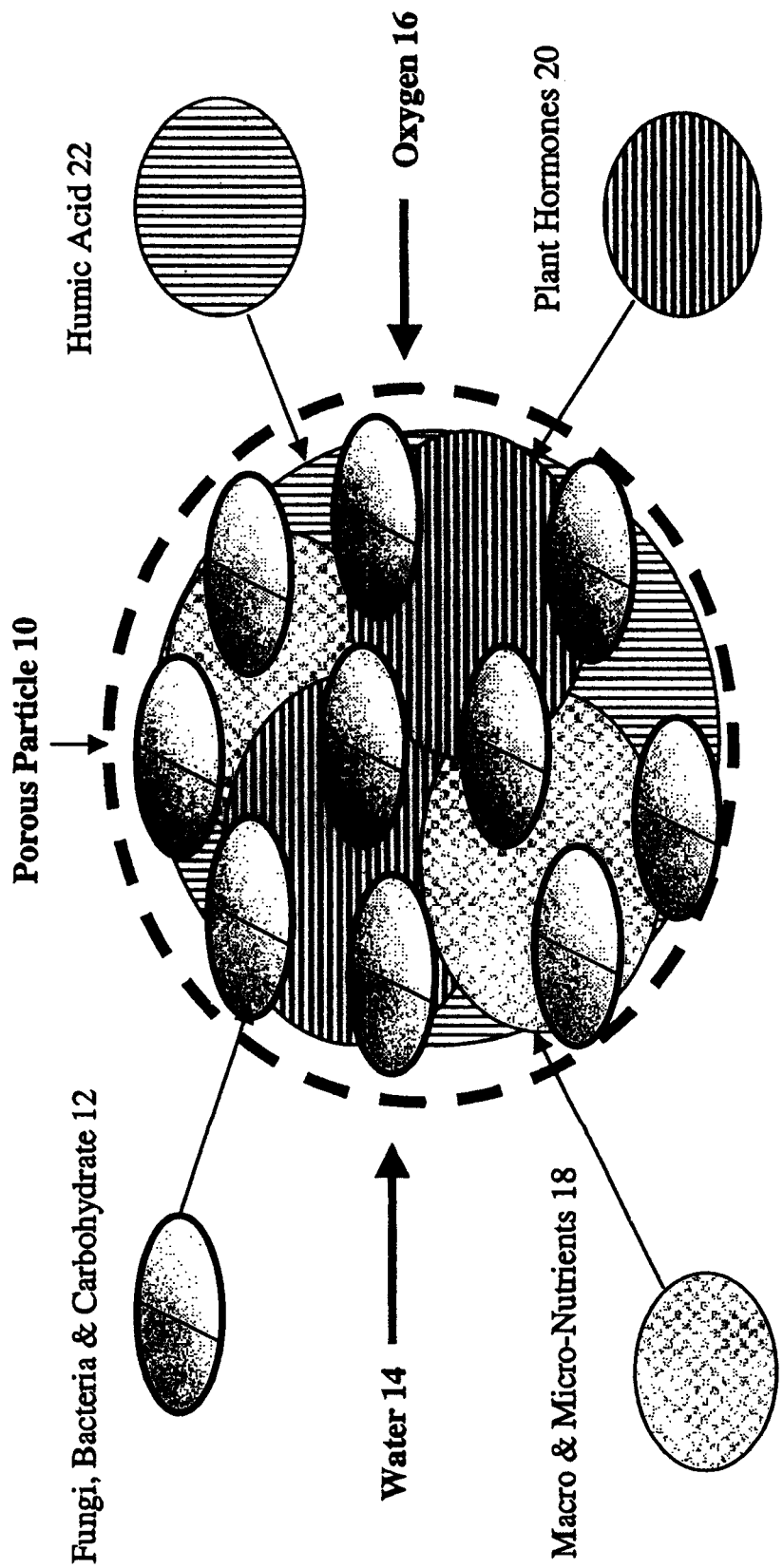

BIOLOGICAL SOIL NUTRIENT SYSTEM

This application is a continuation-in-part of U.S. application Ser. No. 11/619,831 filed Jan. 4, 2007, now U.S. Pat. No. 7,854,926, the disclosure of which are is incorporated in its entirety by reference herein.

BACKGROUND OF THE INVENTION

1. Field of the Invention

The invention relates to biological soil treatment products which improve the soil biology of adventitious plants and a method for delivery directly to the plant root systems.

2. Description of Related Art

Biological soil treatments are currently marketed in a dry powder or solution for preparing soil beds prior to installation of sod, golf course greens and sports turf. The benefits of these biological soil treatments are generally realized only when positioned under the sod or established turf, allowing the use of insecticides, herbicides and fungicides on the laid sod that will not affect the soil treatment.

However, use of biological soil treatments is limited in that once the sod/grass is established, there is no efficient way to reach the roots to treat large areas, or to innoculate areas that did not receive an effective amount of the biological soil treatment formula. In order to ensure a sufficient amount, the tendency is to over-innoculate rather than under innoculate the soil in preparation for laying sod/turf, greatly increasing the expense of the soil treatment.

In particular, U.S. Pat. No. 5,147,441 entitled "Biological Product for Soil Improvement and Method of Application to Soil" issued Sep. 15, 1992, discloses a soil treatment formula which includes adding a nitrogen-fixing *Azospirillum* species of bacteria to the soil treatment formulation and increasing the cellulosic content to feed the bacteria. In general, these soil treatment formulas are created by experimentation with different bacteria, fungi and nutrients in varying concentrations to determine which combination will work best with the desired plant type and whether used for planting from seed or sod. In particular, during golf course turf construction, on U.S. Golf Association (USGA) sand based greens, there are inadequate levels of soil organisms, this fact contributes to nutrient leaching and poor utilization of plant nutrients.

Currently, the different biological soil treatments are sold commercially as a dry mixture and have a tendency to separate by size over time, essentially requiring greater amounts of the mixture be used to ensure proper soil nutrient management. Examples of these mixtures include, Mycor Turf Saver (Plant Health Care, Pittsburgh, Pa.) and Soil Innoculums (Soil Life Co., Oregon City, Oreg.). These formulations generally contain microbes, fungal spores, and organic nutrients for the plants as well as the developing fungi and bacteria. These dry soil treatments are generally delivered to the soil prior to laying down sod or grass seed using a drop spreader with a tiller which generally results in a 10-15% loss of product during soil inoculation due to wind. Many vendors recommend immediately wetting the soil after inoculation to reduce the amount blown away. Biological soil treatment formulations when prepared in solution generally have a reduced shelf life and require adequate mixing to ensure delivery of the appropriate concentration of the soil treatment.

The narrow region of soil that is directly influenced by the root secretions and associated with soil microorganism is defined as the rhizosphere. In addition, the soil treatments containing microorganisms may be undermined by nematodes and arthropods which feed on the soil bacteria and fungi and limit their effective lifespan. These predators are generally controlled with pesticides which selectively kill the nematodes and arthropods and allow the soil bacteria and fungi to form symbiotic relationships with the plant and facilitate food, water and air usage by the plant's root systems. When the environment is conducive, a higher biological activity significantly reduces nutrient leaching, the majority of plant nutrients are made available to plants via these microorganisms.

Landscapers, greens keepers and sports grounds keepers look for the most cost-effective way to maintain large acres of sports turf, grass and landscapes. They search for the best methods for soil preparation prior to laying new turf and when a soil treatment fails, it is costly to replace these entire areas of dead sod. Therefore, there is a need in the industry to overcome the problem of delivery of biological soil treatments to mature, stable lawns, sports turf and landscaping without disturbing or replacing the sod surface. There is also a need for an improved system of direct delivery of biological soil treatments to the rhizosphere of the root systems with minimal loss of product. A rhizosphere containing an appropriate mixture of biological soil nutrients promotes nourishment and growth of the root systems.

U.S. Pat. No. 4,551,165 entitled "Mycorrhizal Seed Pellets" issued Nov. 5, 1985 (expired) utilized a soil treatment formulation containing the *Glomus* fungal species which is then embedded in peat moss with the desired seed to form a seed pellet, however it does not include a beneficial bacteria in the formulation. The patent claims that peat moss is superior to clay or sand due to the moisture and nutrient requirements of the seeds.

There are several ways to innoculate the soil with root treatments, including manual soil penetration methods to deliver the biological soil treatments, automated soil penetration equipment or subterranean piping such as an irrigation system. U.S. Pat. No. 5,447,866 entitled "Reactor for Microorganisms and Feed Device Therefore" filed Sep. 5, 1995, discloses a device to take dry soil treatment components, mix with nutrients in a growth media connected to an irrigation system for direct treatment of the soil. However, these types of irrigation systems are more conducive to agricultural crops and are not cost effective for sports arenas and golf courses.

Therefore, there exists a need in the grounds maintenance industry for a biological soil nutrient system which allows application prior to and after sod, turf and greens installation. There also exists a need to rapidly deliver such nutrient systems over large acres of golf greens and sports turf without a rapid turnaround time for their intended use.

SUMMARY OF THE INVENTION

The invention pertains to a biological soil treatment composition and method for manufacture of porous ceramic particles containing the biological soil treatment composition. The invention also pertains to a method for delivery of the treated porous ceramic particles to the desired plant rhizosphere for successful soil treatment. These improvements in soil nutrient management are facilitated by a biological soil treatment composition, which primarily provides beneficial bacteria and fungi. The microorganisms form symbiotic rhizomes on the roots system to facilitate food and water usage by the plant.

Second, carbohydrates and other food sources for the dormant bacteria and fungi are included to increase the colony forming of the organisms. Third, a porous ceramic particle, which protects the biological soil treatment from wind and water erosion and, due to its size, reduces loss of the soil treatment from the treated area. This protection has been shown to facilitate the significant increase in biological activity of the microorganism.

And finally, the invention provides a delivery system, which directly injects the biological soil treatment system, into the rhizosphere of the root systems of newly laid sod, mature sports turf and landscaping areas, specifically, utilizing a soil aeration apparatus similar to the DryJect™ system (DryJect Manufacturing, LLC in Hatboro, Pa., wholely owned by Profile Products, LLC.).

The biological soil treatment composition may be mixed with sand or soil in a dry form at up to one third by volume and delivered to the planting site as the growing medium for applications which may include golf course construction, installation of flower beds as well as treatment of growing lawns, flower beds, shrubs and vegetable producing gardens. The composition should also be considered for use where required to reduce nutrient leaching from the soil profile.

BRIEF DESCRIPTION OF THE DRAWINGS

FIG. 1 is a diagram of a biological soil treatment composition.

DETAILED DESCRIPTION OF THE PREFERRED EMBODIMENT(S)

1. Biological Soil Treatment Composition

In an embodiment of a biological soil treatment containing the symbiotic *Glomus* fungal species, the symbiotic *Bacillus* bacterial species and a carbohydrate food source 12 are combined in an effective concentration with a porous particle 10, wherein the target host is a plant root system as illustrated in FIG. 1. In a variation of present embodiment, the porous particles are a porous ceramic particle. Suitable porous particles include those commercially available as Profile Porous Ceramic particles by Profile Products, LLC of Buffalo Grove, Ill. These porous ceramic particles are clay-based montmorillonite particles mined from Blue Mountain, Miss. and fired to 1000° C. to make a porous ceramic particle. The Profile Porous Ceramic (PPC) particles were originally developed to be an inorganic soil treatment to preserve water 14 and oxygen 16 flow to plant root systems in easily compacted soil. In a refinement of the present embodiment, the particles porosity is from 60 to 90 volume percent. In another variation, the particles porosity is from 64 to 85 volume percent. They are generally dispensed in a bulk density of 945 pounds per cubic yard.

However, due to the natural porosity of this clay-based ceramic particle, when mixed with a biological soil treatment the dormant organisms, nutrients, and growth media become embedded within the pores of the ceramic particle. In one variation, the microorganisms when combined with the porous ceramic particles are mixed in a range of approximately 0.01%-20% by weight of porous ceramic particles. In a refinement of this embodiment, the microorganisms are combined with the porous ceramic particles in a range of approximately 0.10%-3.0% by weight of porous ceramic particles. The porous ceramic particles provide protection to the microorganisms from wind, water erosion and increases the amount of biological soil treatment available to the plant root systems.

The biological soil treatment composition may comprise endomycorrhizial and ectomycorrhizial symbiotic fungi, a symbiotic bacteria and beneficial nutrients for the soil, nutrients for the plants and nutrients for the biological species including a carbohydrate source, in particular, a starch. The preferred biological soil treatment composition contains endomycorrhizial fungi, specifically, *Glomus intraradices, Glomus mosseae, Glomus aggregatum* and *Glomus etunicatum*, or a mixture thereof. These species have the ability to attach to root systems in a symbiotic relationship or form spores and thus survive during a long winter. The preferred symbiotic soil bacteria from the *Bacillus* species which are also spore formers include, *Bacillus licheniformis, Bacillus megaterium, Bacillus oleronius, Bacillus pumilis, Marinibacillus marinus* (formerly *Bacillus marinus*) and *Paenibacillus lentimorbus* (formerly *Bacillus lentimorbus*), or a mixture thereof.

The biological organisms may be grown separately, in organism-specific media, as to species *Bacillus* or *Glomus* or grown in generic media promoting growth for both the fungi and bacteria. The preferred embodiment may utilize organisms purchased in a liquid bath which controls dormancy. Alternatively, these organisms may be purchased in a dried, freeze dried or frozen state, mixed in the desired combination and directly added to the biological soil treatment composition.

The composition also contains soil and plant macro-nutrients and micro-nutrients 18 as well as biological nutrients to promote the growth and development of the fungi and bacteria. A carbohydrate is added to the organism's liquid bath. The plant nutrients include plant hormones 20, such as auxins and cytokinins. The soil/plant nutrients may include phosphorous, nitrogen and potassium. Other nutrients may also include agents such as humic acid 22. These nutrients may be lost over time due to improper fertilization. The micro-nutrients are chosen to promote a rich environment for the root systems and these choices must be balanced with an environment favorable to the biological organisms. Although other components may be included, a preferred biological soil treatment composition is listed in Table 1.

TABLE 1

| Biological Soil Nutrient Composition Ingredients |
| --- |
| *Glomus* species |
| *Bacillus* species |
| Soil/Plant Macro-Nutrients: Phosphorous, nitrogen, calcium, magnesium, sulfur and/or potassium; and plant hormones, including auxins and cytokinins |
| Soil/Plant Micro-Nutrients: Manganese, iron, boron, zinc, copper, molybdenum and/or chlorine |
| Biological Nutrients: Carbohydrates, i.e. starch |
| Other Nutrients: Biostimulants, including Humic acid |

The biological soil treatment composition is used to impregnate the porous ceramic particle 10, which contain pores and channels which will provide a natural biological environment for the delivery and development of the microorganisms.

The porous ceramic particle 10 provides a delivery vehicle for optimum placement of the microorganisms close to the root system and due to its size retains its location in the soil. This method of root treatment is superior to soil treatment compositions commercially available as powders and sprays, which may be easily diluted and washed deeper into the soil away from the root systems.

In one or more embodiments, there is provided a biological soil nutrient system including: symbiotic microorganisms selected from the group consisting of symbiotic bacterial, symbiotic fungi, and combinations thereof; and inorganic particles having pores contacting at least a portion of the symbiotic microorganisms, the inorganic particles being selected from the group consisting of smectite clay, perlite, vermiculite, zeolite, Fuller's earth, diatomatious earth, and combinations thereof. In certain instances, the inorganic particles further include clay-based porous ceramic particles described herein. Without wanting to be limited by any particular theory, it is believed that the porosity provides an ideal habitat for the symbiotic microorganisms, and that when the microorganisms feel safe and comfortable and have plenty of food, they multiply relatively more rapidly.

In one or more embodiments, the inorganic particles are present in 0.1 percent to 20 percent, 1 percent to 15 percent by weight, 1 percent to 10 percent by weight, or 3 percent to 7 percent by weight of the total dry solids of the biological soil nutrient system.

In one or more embodiments, the biological soil nutrient system further includes sand. When used, the sand is provided at a weight ratio of 0.1 percent to 70 percent, 0.1 percent to 55 percent, 0.1 percent to 30 percent, or 0.1 percent to 15 percent by weight of the total dry solids of the biological soil nutrient system. This design of biological soil nutrient system is particularly useful for certain applications such as those involved in the golf industries wherein sand provides a desirable base for supporting various golfing activities. When used in the biological nutrient system, the sand may include any suitable types, and particularly include one or more types listed in Table 1 shown below, wherein whose particle diameter size and average surface area are characterized relative to the PPC particles. As far as the average surface area is concerned, the sand types listed in Table 2 may be considered non-porous relative the PPC particles, smectite clay, perlite, vermiculite, zeolite, Fuller's earth, or diatomatious earth.

TABLE 2

| Particle Type | Diameter (millimeters) | Average Surface Area (square meters per gram of dry weight) |
|---|---|---|
| Coarse Sand | 1.0 to 0.5 | 20 |
| Profile Porous Ceramic (PPC) Particles | 1.0 to 0.25 | 8,210,000 |
| Medium Sand | 0.5 to 0.25 | 50 |
| Fine Sand | 0.25 to 0.05 | 100 |
| Very Fine Sane | 0.10 to 0.05 | 250 |

In one or more embodiments, the biological soil nutrient system may be moisturized. In certain instances, the biological soil nutrient system has a water content of no less than 0.05 percent, 0.5 percent, 1.0 percent, 2.5 percent, 5.0 percent, or 7.5 percent by weight, and of no greater than 20 percent, 17.5 percent, 15.0 percent, 12.5 percent, or 10.0 percent by weight.

The moisture may be implemented in any suitable ways. For instance, the inorganic particles may be first wetted with water and the resultant moisturized inorganic particles are better positioned to attract and adhere to any contacting materials. In this variation, the other ingredients such as the symbiotic microorganisms may be provided as dry materials, or particularly dry powdery materials. The dry ingredients are then mixed with the moisturized inorganic particles to the biological soil nutrient system. For instance also, one or more ingredients other than the inorganic particles may be prepared as a moisturized composition, and particularly a composition with a sprayable consistency. In this variation, the moisturized ingredients may be spray applied to dry inorganic particles to form a thin film in and around the inorganic particles.

Whether or not moisture is provided, the inorganic particles may be added to the biological soil nutrient composition during manufacture or prior to dispensing to soil. Likewise, the addition of soil nutrients, plant nutrients, and/or nutrients for the symbiotic microorganisms may be added during the biological soil nutrient composition preparation or just prior to dispensing to soil.

2. Method of Manufacture

The preferred method of preparation is by spraying the porous particles with the biological soil treatment composition. The particles have a zero to 4% moisture content, which promotes absorption of the soil treatment composition into the particle pore space. The maximum particle moisture content is 10% to ensure the organisms remain dormant. Moisture content greater than 14% is required to activate the growth cycle of the dormant organisms. The clay-based porous ceramic particles or other porous particles may be processed by treatment with the biological soil composition to form a biological soil nutrient system. Once the biological soil nutrient system is mixed with soil and hydrated the microorganisms become active. Other porous particles include perlite, vermiculite or other particles containing pore spaces capable of holding both water and air. The treated particles may then be stored dry under a wide range of temperatures up to 100° F. packaged in bags of 5 to 50 pounds each, or as required for commercial use.

The containers are preferably sealed to reduce personnel coming in contact with spores and microorganisms when handling the materials. USDA labeling will be determined by species and MSDS recommendations.

3. Method of Delivery of Biological Soil Nutrient System

In the field of soil biology, aeration of the soil is necessary for successful growth of plants by ensuring the root systems have adequate access to air and water. The grounds maintenance industry utilize different types of equipment to promote aeration of the soil. An industry leader in the field of grounds maintenance developed the DryJect™ system which is manufactured by DryJect Manufacturing, LLC in Hatboro, Pa., a Profile Products, LLC company. This hydro injection system is utilized to relieve soil compaction which stifles root systems and reduce standing water on the surface of the lawn and/or turf. The DryJect™ equipment uses water to fracture the soil with the capability of simultaneously injecting large volumes of dry fertilizers, inorganic soil treatments and pesticides that allow golf courses, and similar surfaces, to be usable in one hour after treatment.

In a preferred embodiment, the biological soil nutrient system is delivered to the soil by a hydro injection system that utilizes water to produce a high pressure aeration hole approximately ¼ by ½ inch wide and from 2-10 inches deep depending the setting and depth of root system in the soil. The penetrating force of the hydro injection system allows the insertion of the nutrients to the root system. The aeration is very temporary and the aeration holes close after a short time. The delivery system is currently available for use with the inorganic porous ceramic particles but the new use for the particles as a delivery vehicle for the biological soil nutrient system will revolutionize turf and lawn maintenance as well as enhance other agricultural soil nutrient processes.

The treatment area is prepared for aeration and the equipment is calibrated to the appropriate depth of the target root system. The amount of biological soil nutrient system material required is calculated as 50 lbs to 250 lbs per 1,000 square feet (sq. ft.). The hydro injection system is loaded with the amount of biological soil nutrient system for the treatment area and initiates delivery to the soil. The use of a hydro injection system is the preferred embodiment for delivery of the biological soil nutrient system.

Another embodiment of the delivery method, is a manual method of delivery using a spiked mechanism to produce the aeration holes. The biological soil nutrient system is placed into the holes by raking manually and is an effective method with smaller areas such as gardens and smaller lawns.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A biological soil nutrient system comprising:

symbiotic microorganisms selected from the group consisting of symbiotic bacterial, symbiotic fungi, and combinations thereof;

inorganic particles having pores and contacting at least a portion of the symbiotic microorganisms within the pores, the inorganic particles being selected from the group consisting of smectite clay, perlite, vermiculite, zeolite, Fuller's earth, diatomatious earth, and combinations thereof; and a soil and plant nutrient selected from the group consisting of macro-nutrients, micro-nutrients, plant hormones, humic acid, and combinations thereof.

2. The biological soil nutrient system of claim 1, further comprising carbohydrates as a nutrient for the symbiotic microorganisms.

3. The biological soil nutrient system of claim 1, further comprising clay-based porous ceramic particles.

4. The biological soil nutrient system of claim 1, further comprising sand.

5. The biological soil nutrient system of claim 1, wherein the symbiotic microorganisms are selected from the group consisting of *Glomus* species of fungi, the *Bacillus* species of bacteria, and combinations thereof.

6. The biological soil nutrient system of claim 5, wherein the *Glomus* species of fungi are selected from the group consisting of *Glomus intraradices, Glomus mosseae, Glomus aggregatum* and *Glomus etunicatum*, and combinations thereof.

7. The biological soil nutrient system of claim 5, wherein the *Bacillus* species of bacteria are selected from the group consisting of *Bacillus licheniformis, Bacillus megaterium, Bacillus oleronius, Bacillus pumilis, Marinibacillus marinus, Paenibacillus lentimorbus*, and combinations thereof.

8. The biological soil nutrient system of claim 1, wherein the inorganic particles are of an amount of 0.05 to 20 percent by weight, based on total dry solids of the biological soil nutrient system.

9. The biological soil nutrient system of claim 1, further comprising water in an amount of 0.05 percent to 20 percent by weight, based on the total weight of the biological soil nutrient system.

10. The biological soil nutrient system of claim 1, wherein the water is in an amount of 1.0 percent to 15 percent by weight, based on the total weight of the biological soil nutrient system.

11. A method of making a biological soil nutrient system, the method comprising:

contacting inorganic particles with a biological soil nutrient composition, wherein the biological soil nutrient composition includes symbiotic microorganisms selected from the group consisting of symbiotic bacterial, symbiotic fungi, and combinations thereof, and a solid and plant nutrient selected from the group consisting of macro-nutrients, micro-nutrients, plant hormones, humic acid, and combinations thereof, and wherein the inorganic particles have pores and are selected from the group consisting of smectite clay, perlite, vermiculite, zeolite, Fuller's earth, diatomatious earth, and combinations thereof, with the inorganic particles contacting at least a portion of the symbiotic microorganisms within the pores.

12. The method of claim 11, wherein the step of contacting is carried out by spraying the biological soil nutrient composition onto and into the inorganic particles.

13. The method of claim 11, further comprising, prior to the step of contacting, wetting the inorganic particles with water.

14. The method of claim 11, further comprising, prior to the step of contacting, wetting the biological soil nutrient composition with water.

15. The method of claim 11, wherein the symbiotic microorganisms are provided as a liquid concentrate, a freeze dried powder, or combinations thereof.

16. The method of claim 15, wherein the symbiotic microorganisms further include carbohydrate as a nutrient.

17. The method of claim 11, wherein the inorganic particles further include clay-based porous ceramic particles.

18. A method of delivering a biological soil nutrient system, the biological soil nutrient system including inorganic particles, symbiotic microorganisms, and a soil and plant nutrient selected from the group consisting of macro-nutrients, micro-nutrients, plant hormones, humic acid, and combinations thereof, the inorganic particles having pores and contacting at least a portion of the symbiotic microorganisms within the pores, the inorganic particles being selected from the group consisting of smectite clay, perlite, vermiculite, zeolite, Fuller's earth, diatomatious earth, and combinations thereof, the symbiotic microorganisms being selected from the group consisting of symbiotic bacterial, symbiotic fungi, and combinations thereof, the method comprising:

contacting soil with the biological soil nutrient system.

19. The method of claim 18, further comprising providing aeration holes in the soil and contacting the aeration holes with the biological soil nutrient system.

20. The method of claim 19, wherein the aeration holes are formed by using a water based injection system.

* * * * *

UNITED STATES PATENT AND TRADEMARK OFFICE
CERTIFICATE OF CORRECTION

PATENT NO. : 8,728,460 B2  
APPLICATION NO. : 12/878270  
DATED : May 20, 2014  
INVENTOR(S) : Kevin Spittle et al.

Page 1 of 1

It is certified that error appears in the above-identified patent and that said Letters Patent is hereby corrected as shown below:

In the Claims

Column 7, Line 18, Claim 1

After "of symbiotic" delete "bacterial," and
Insert -- bacteria, --.

Column 8, Lines 10 and 11, Claim 11

After "of symbiotic" delete "bacterial," and
Insert -- bacteria, --.

Column 8, Line 49, Claim 18

After "of symbiotic" delete "bacterial," and
Insert -- bacteria, --.

Signed and Sealed this
Thirtieth Day of September, 2014

Michelle K. Lee
*Deputy Director of the United States Patent and Trademark Office*